United States Patent
Hsu et al.

(10) Patent No.: US 10,832,218 B1
(45) Date of Patent: Nov. 10, 2020

(54) USER INTERFACE FOR VISUALIZATION OF AN ATTRITION VALUE

(71) Applicant: Palantir Technologies Inc., Palo Alto, CA (US)

(72) Inventors: Richard Hsu, Herndon, VA (US); Brendan Weickert, McLean, VA (US); Krishnan Aiyer, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 1102 days.

(21) Appl. No.: 15/091,368

(22) Filed: Apr. 5, 2016

(51) Int. Cl.
| | |
|---|---|
| *G06Q 10/00* | (2012.01) |
| *G06Q 10/10* | (2012.01) |
| *G06F 17/18* | (2006.01) |
| *G06Q 10/06* | (2012.01) |

(52) U.S. Cl.
CPC .......... *G06Q 10/105* (2013.01); *G06F 17/18* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 5,568,390 A | 10/1996 | Hirota et al. | |
| 5,857,329 A | 1/1999 | Bingham | |
| 5,890,140 A * | 3/1999 | Clark | G06Q 20/10 705/35 |
| 5,902,349 A | 5/1999 | Endo et al. | |
| 5,930,764 A * | 7/1999 | Melchione | G06Q 30/02 705/7.29 |
| 6,055,573 A * | 4/2000 | Gardenswartz | G06Q 30/02 709/219 |
| 6,298,330 B1 * | 10/2001 | Gardenswartz | G06Q 30/02 705/14.25 |

(Continued)

FOREIGN PATENT DOCUMENTS

| | | |
|---|---|---|
| EP | 0652513 | 5/1995 |
| EP | 1926074 | 5/2008 |

(Continued)

OTHER PUBLICATIONS

Ballesteros et al., "Batching: A Design Pattern for Efficient and Flexible Client/Server Interaction," Transactions on Pattern Languages of Programming, Springer Berlin Heildeberg, 2009, pp. 48-66.

(Continued)

*Primary Examiner* — Gurkanwaljit Singh
(74) *Attorney, Agent, or Firm* — Schwegman Lundberg & Woessner, P.A.

(57) ABSTRACT

Aspects of the present disclosure involve approaches for calculating an attrition value of a population on the probability that attrition will occur within a predefined time period, and additionally, to calculate an individual attrition value of various features of the population based on their contribution to the calculated attrition value of the population. A computer, such as a server, may receive a cohort definition that includes one or more features and corresponding feature values from a third-party data source or client device. A cohort definition defines a subset of users from among the population of users, based on various combinations of features and feature values.

20 Claims, 13 Drawing Sheets

(56) References Cited

U.S. PATENT DOCUMENTS

| | | | |
|---|---|---|---|
| 6,496,774 B1 | 12/2002 | Davies | |
| 6,608,559 B1 | 8/2003 | Lemelson et al. | |
| 7,013,285 B1* | 3/2006 | Rebane | G06Q 30/02 705/7.31 |
| 7,080,027 B2* | 7/2006 | Luby | G06Q 10/06 705/7.31 |
| 7,165,037 B2* | 1/2007 | Lazarus | G06Q 30/02 705/7.31 |
| 7,212,979 B1* | 5/2007 | Matz | G06Q 30/02 348/E7.071 |
| 7,603,229 B2 | 10/2009 | Goldberg et al. | |
| 7,617,160 B1* | 11/2009 | Grove | G06Q 10/10 705/500 |
| 7,734,570 B2* | 6/2010 | Bachman | G06Q 30/02 |
| 7,783,534 B2* | 8/2010 | Armstrong | G06Q 10/06375 705/29 |
| 7,818,291 B2 | 10/2010 | Ferguson et al. | |
| 7,941,321 B2 | 5/2011 | Greenstein et al. | |
| 7,957,991 B2* | 6/2011 | Mikurak | G06Q 10/06 705/7.11 |
| 8,032,409 B1* | 10/2011 | Mikurak | G06Q 10/00 705/14.39 |
| 8,042,110 B1 | 10/2011 | Kawahara et al. | |
| 8,046,283 B2 | 10/2011 | Burns | |
| 8,108,138 B2 | 1/2012 | Bruce et al. | |
| 8,200,527 B1* | 6/2012 | Thompson | G06Q 10/0639 705/7.39 |
| 8,352,174 B2 | 1/2013 | Milstein et al. | |
| 8,417,409 B2 | 4/2013 | Bast et al. | |
| 8,763,078 B1 | 6/2014 | Castellucci et al. | |
| 8,786,605 B1 | 7/2014 | Curtis et al. | |
| 9,092,482 B2 | 7/2015 | Harris et al. | |
| 9,280,532 B2 | 3/2016 | Cicerone | |
| 9,323,736 B2* | 4/2016 | Haine | G06Q 10/067 |
| 2002/0004754 A1* | 1/2002 | Gardenswartz | G06Q 30/02 705/26.1 |
| 2002/0046105 A1* | 4/2002 | Gardenswartz | G06Q 30/02 705/14.25 |
| 2003/0004736 A1* | 1/2003 | Calderaro | G06Q 10/06313 705/7.23 |
| 2004/0153418 A1 | 8/2004 | Hanweck | |
| 2005/0091077 A1* | 4/2005 | Reynolds | G06Q 10/06 705/7.33 |
| 2006/0089914 A1* | 4/2006 | Shiel | G06Q 30/00 705/52 |
| 2006/0178918 A1* | 8/2006 | Mikurak | G06Q 10/06 705/7.25 |
| 2006/0241856 A1 | 10/2006 | Cobleigh et al. | |
| 2007/0027727 A1* | 2/2007 | Cochrane | G06F 19/328 705/4 |
| 2007/0088596 A1 | 4/2007 | Berkelhamer et al. | |
| 2007/0112607 A1* | 5/2007 | Tien | G06Q 10/00 705/7.39 |
| 2007/0198571 A1 | 8/2007 | Ferguson et al. | |
| 2007/0220604 A1 | 9/2007 | Long | |
| 2008/0222127 A1* | 9/2008 | Bergin | G06Q 10/10 |
| 2008/0301559 A1 | 12/2008 | Martinsen et al. | |
| 2008/0313281 A1 | 12/2008 | Scheidt et al. | |
| 2009/0037912 A1 | 2/2009 | Stoitsev et al. | |
| 2009/0164293 A1* | 6/2009 | Coley | G06Q 10/06311 705/7.13 |
| 2009/0319418 A1 | 12/2009 | Herz | |
| 2010/0042456 A1* | 2/2010 | Stinchcombe | G06Q 10/06 705/35 |
| 2010/0162371 A1 | 6/2010 | Geil | |
| 2010/0191598 A1* | 7/2010 | Toennis | G06Q 30/02 705/14.36 |
| 2010/0205662 A1 | 8/2010 | Ibrahim et al. | |
| 2011/0041084 A1 | 2/2011 | Karam | |
| 2011/0153592 A1 | 6/2011 | DeMarcken | |
| 2011/0185401 A1 | 7/2011 | Bak et al. | |
| 2012/0011068 A1* | 1/2012 | Dearing | G06Q 10/083 705/50 |
| 2012/0016733 A1* | 1/2012 | Belvin | G06Q 30/02 705/14.41 |
| 2012/0101952 A1 | 4/2012 | Raleigh et al. | |
| 2012/0290506 A1 | 11/2012 | Muramatsu et al. | |
| 2013/0036346 A1 | 2/2013 | Cicerone | |
| 2013/0231862 A1 | 9/2013 | Delling et al. | |
| 2014/0081685 A1 | 3/2014 | Thacker et al. | |
| 2014/0100846 A1* | 4/2014 | Haine | G06F 17/248 704/9 |
| 2014/0100901 A1* | 4/2014 | Haine | G06F 17/248 705/7.11 |
| 2014/0100923 A1* | 4/2014 | Strezo | G06Q 10/067 705/7.39 |
| 2014/0181833 A1 | 6/2014 | Bird et al. | |
| 2015/0120176 A1 | 4/2015 | Curtis et al. | |
| 2015/0186817 A1* | 7/2015 | Kim | G06Q 10/0635 705/7.28 |
| 2015/0261817 A1 | 9/2015 | Harris et al. | |
| 2015/0269244 A1* | 9/2015 | Qamar | G06Q 10/06398 705/7.42 |
| 2016/0203117 A1* | 7/2016 | Haine | G06F 17/248 704/9 |

FOREIGN PATENT DOCUMENTS

| | | |
|---|---|---|
| EP | 2555126 | 2/2013 |
| EP | 2876587 | 5/2015 |
| WO | WO 2012/025915 | 3/2012 |

OTHER PUBLICATIONS

Bogle et al., "Reducing Cross-Domain Call Overhead Using Batched Futures," SIGPLAN No. 29, 10 (Oct. 1994) pp. 341-354.

Chen et al., "A Novel Emergency Vehicle Dispatching System," 2013 IEEE 77th Vehicular Technology Conference, IEEE, Jun. 2, 2013, 5 pages.

Eklund et al., "A Dynamic Multi-source Dijkstra's Algorithm for Vehicle Routing," Intelligent Information Systems, 1996, pp. 329-333.

Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.

Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.

Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.

"Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.

Reedy, Sarah, "Policy and Charging Rules Function (PCRF)," Sep. 13, 2010, http://www.lightreading.com/document.asp?doc_id=680015 printed Dec. 10, 2013 in 4 pages.

Stamos et al., "Remote Evaluation," Journal ACM Transactions on Programming Languages and Systems (TOPLAS), vol. 12, Issue 4, Oct. 1990, pp. 537-564.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Notice of Allowance for U.S. Appl. No. 13/826,228 dated Mar. 27, 2015.

Notice of Allowance for U.S. Appl. No. 13/196,788 dated Dec. 18, 2015.

(56) References Cited

OTHER PUBLICATIONS

Notice of Allowance for U.S. Appl. No. 14/302,279 dated Apr. 5, 2016.
Official Communication for New Zealand Patent Application No. 623323 dated Apr. 17, 2014.
Official Communication for New Zealand Patent Application No. 623323 dated Jun. 6, 2014.
Official Communication for German Patent Application No. 10 2013 221 057.4 dated Mar. 23, 2015.
Official Communication for German Patent Application No. 10 2013 221 052.3 dated Mar. 24, 2015.
Official Communication for European Patent Application No. 14162372.8 dated Apr. 30, 2015.
Official Communication for Netherlands Patent Application No. 2012436 dated Nov. 6, 2015.
Official Communication for Canadian Patent Application No. 2846414 dated Apr. 13, 2016.
Official Communication for U.S. Appl. No. 14/196,814 dated May 5, 2015.
Official Communication for U.S. Appl. No. 13/657,656 dated May 6, 2015.
Official Communication for U.S. Appl. No. 14/302,279 dated Sep. 24, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 14/726,211 dated Apr. 5, 2016.

* cited by examiner

RISK SCORE DASHBOARD — 1200

| ID | RISK | GROUP | RANK |
|---|---|---|---|
| | 77.33% | COOK | SENIOR |
| | 69.98% | SCIENTIST | JUNIOR |
| | 66.51% | JANITOR | JUNIOR |
| | 65.56% | MANAGER | SENIOR |
| | 63.78% | JANITOR | SENIOR |
| | 59.90% | DANCER | TEMP |
| | 59.22% | SECURITY | JUNIOR |
| | 57.57% | NINJA | SENIOR |
| | 57.30% | CHEF | JUNIOR |
| | 56.67% | JANITOR | JUNIOR |
| | 55.79% | SECRETARY | JUNIOR |
| | 55.10% | SERVER | SENIOR |
| | 53.83% | PIANIST | SENIOR |
| | 53.16% | COOK | SENIOR |
| | 51.58% | CHEF | SENIOR |

SHOWING 1 TO 15 OF 14,201 ENTRIES    PREVIOUS  1  2 3 4 5 ... 947  NEXT — 1210

FILTER CRITERIA — 1040

AVERAGE OPG
70 TO 74 ▶

INCLUDE    EXCLUDE ▶

CALCULATE RISK

MINIMUM LENGTH OF SERVICE — 1120

USER INTERFACE FOR VISUALIZATION OF AN ATTRITION VALUE

TECHNICAL FIELD

The subject matter disclosed herein relates to graphical user interfaces for the presentation and visualization of data. In particular, example embodiments may relate to machines configured to generate and display graphical elements representative of attrition values within a graphical user interface.

BACKGROUND

Attrition, as used herein, refers to the gradual reduction of the size of a population (e.g., of users, subscribers). Various contributing factors can lead to attrition of a population, including both voluntary, as well as involuntary factors. While attrition in a population is generally unavoidable, it is often a goal of employers to reduce attrition in the workplace as much as possible. It may therefore prove advantageous to identify the probability that an individual among the population is to undergo a "death event," and also to identify the relative contribution of various features to the likelihood of the death event occurring. A death event may include, for example, an individual leaving a group or organization (e.g., quitting or being fired), or unsubscribing from a service.

Conventional analysis involves application of standard linear regression. However, these standard linear regression techniques are inaccurate as they ignore a significant amount of data relating to the death event not occurring. As a result, the resulting calculations are biased towards attrition occurring within the population.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 12 is an interface diagram illustrating an attrition value visualization interface, consistent with some embodiments.

DETAILED DESCRIPTION

Figure 1:
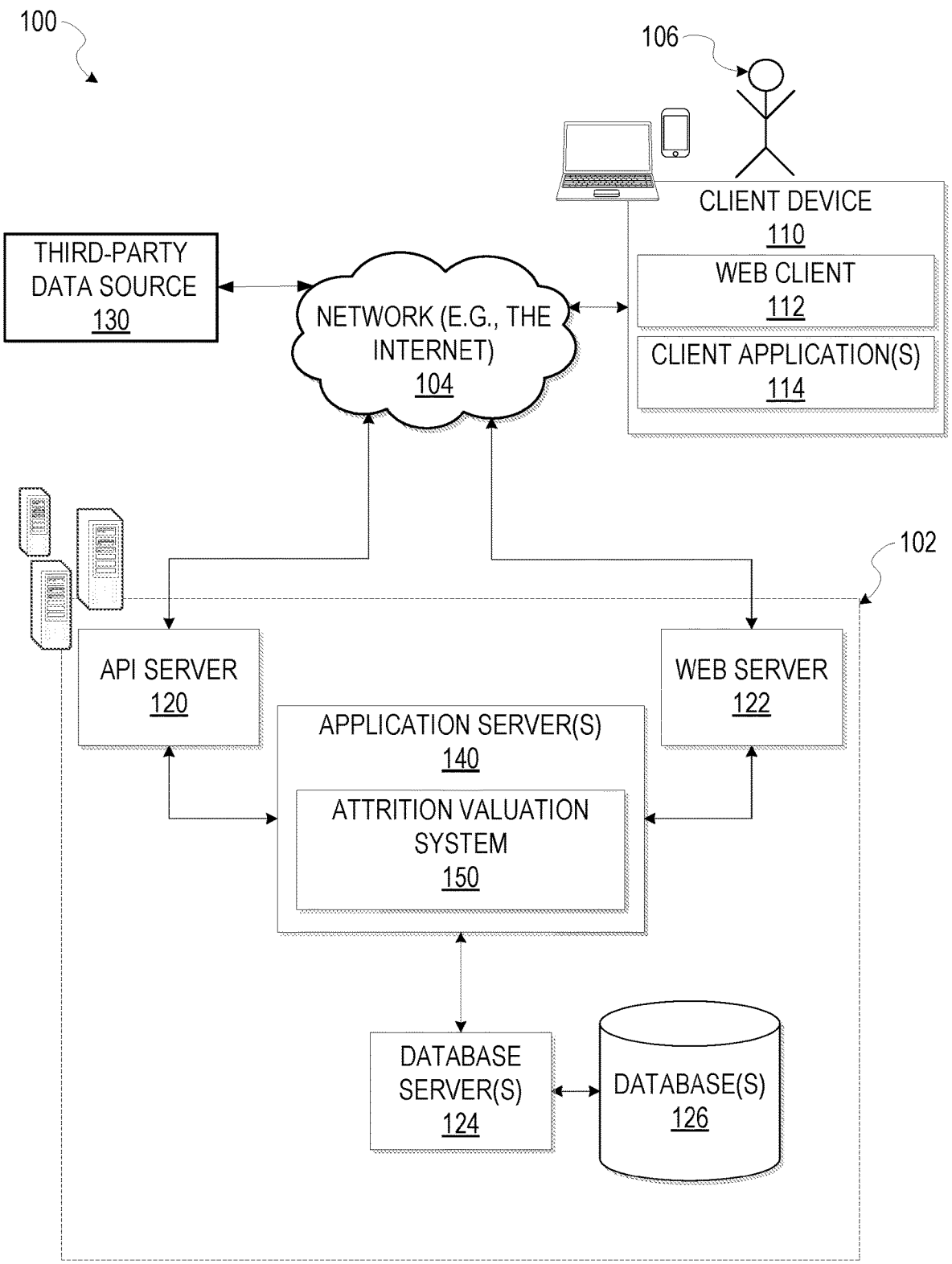
FIG. 1 is a network diagram depicting a network system comprising a group of application servers in communication with a network-based attrition valuation system configured for receiving employment data to generate and present a graphical user interface for displaying an attrition value of a user or population of users, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, standard linear regression techniques do not provide an accurate prediction for attrition rates in a population of subscribers, as they ignore a significant amount of data relating to a "death event" (e.g., something that leads to attrition) not occurring. As a result, the resulting calculations from standard linear regression techniques are biased towards attrition occurring within the population. One technical problem addressed by some aspects of the present disclosure include generating and causing display of a graphical user interface (GUI) to accurately determine and present risk-scores associated with a population of subscribers.

Example embodiments involve approaches for calculating an attrition value (e.g., a risk-score) of an individual (e.g., a user), or a population (e.g., of users, subscribers) on the probability that attrition will occur within a predefined time period, and additionally, to calculate an individual attrition value of various features of the population (e.g., demographics, user information, employment information) based on their contribution to the calculated attrition value of the population. A computer, such as a server, may receive a cohort definition that includes one or more features and corresponding feature values from a third-party data source or client device. A cohort definition defines a subset of users from among the population of users (hereinafter also referred to simply as "subset"), based on various combinations of features and feature values. Features include attributes and characteristics of users, and feature values include specific values of those attributes and characteristics, among others. For example, a "feature" may be "age," while a "feature value" may be "31." In the context of attrition within a workforce population, a cohort definition as it applies to the workforce population of a business may include a subset defined by a role within an organization, a city of employment, an age, and a salary, among others. In response to receiving the cohort definition, the computer retrieves employment data associated with the subset of users defined by the cohort definition. For example, the employment data may reside in a local or remote data repository.

The computer may compute, based on the employment data of the subset defined by the cohort definition, an attrition value to assign to the subset of users, based on the employment data. The attrition value may include for example, a pure number value, percentage, or other statistical model (e.g., Kaplan-Meier survival curve, Cox model) that indicates a likelihood that a particular user, or subset of users, will leave (e.g., leave a company, unsubscribe, quit). The computer may generate a visualization of the risk-score, and cause display of the visualization of the risk-score within a GUI at a client device (e.g., based on the model used to calculate the risk-score). The visualization may include a curve on an axis (e.g., Kaplan-Meier survival curve, a Cox model), and/or a bar graph, indicating the risk-score of the subset of users defined by the cohort definition. The bar graph displays the coefficients used in the Cox model. A Kaplan-Meier survival curve is a series of declining horizontal steps which, with a large enough sample size, approaches a survival function for a population. A Cox model is a statistical technique for exploring the relationship between the survival of an individual (e.g., user) and several explanatory variables. The computer may index and store the visualization at a memory location associated with the subset defined by the cohort definition.

According to some example embodiments, the computer may receive a second cohort definition that includes a different combination of features and feature values. Based on the second cohort definition, the computer retrieves employment data of a subset of users defined by the cohort definition, calculates a risk-score of the subset of users based on the employment data, and generates a visualization of the risk-score. The computer may overlay the visualization of the risk-score of the subset of users defined by the second cohort definition over the visualization of the subset of users previously defined, thus enabling a user to view and compare risk-scores of distinct subsets of users. The computer may store the visualization of the subset of users defined based on the second cohort definition at a memory location associated with the second cohort definition. A user of the computer may retrieve the visualization by providing a selection of an identifier of the second cohort definition, wherein in response, the computer retrieves and causes display of the visualization within the GUI at the client device.

According to some example embodiments, in calculating the risk-score of the subset of users, the computer may additionally calculate a contribution of each feature of the subset to the calculated risk-score, and cause display of the contribution within the GUI. For example, the contribution of the feature may include a percentage, or other statistical value that indicates how much the feature effects the attrition value (e.g., risk-score) of the subset of users.

According to some example embodiments, the computer may receive a threshold risk-score to compare against the calculated risk-score of the subset of users defined by the cohort definition from a client device or third-party data source. If the risk-score of the subset of users defined by the cohort definition transgresses the threshold risk score, the computer may apply an intervention protocol to the subset of users. The intervention protocol may include, for example, an incentive (e.g., monetary or other similar incentive).

FIG. 1 is a network diagram illustrating a network environment 100 suitable for operating an attrition valuation system 150, according to some example embodiments. A networked system 102 provides server-side functionality, via a network 104 (e.g., an intranet, the Internet or a Wide Area Network (WAN)), to one or more clients such as the client device 110 (operable by a user 106), and third party data source 130. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the attrition valuation system 150. The application servers 140 are, in turn, shown to be coupled to one or more database servers 124 that facilitate access to one or more databases 126.

A attrition valuation system 150 performs operations that include receiving a cohort definition that defines a subset of users based on a combination of features and feature values, retrieves employment data of the subset of users, calculates an attrition value of the subset of users (e.g., individually and as a group), and causes display of a visualization of the attrition value at the client device 110, for the networked system 102. For example, the attrition valuation system 150 is configured to receive a cohort definition from a client device 110, access the third party data source(s) to retrieve employment data, calculate an attrition value of the subset of users defined by the cohort definition, and generate and cause display of a GUI that includes a presentation of the attrition value at the client device 110. The third party data source(s) may be or include a database (e.g., similar to database 126). In some example embodiments, the third party data source(s) 130 includes a web server machine operated by a third party (e.g., an entity distinct from the attrition valuation system 150).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) to exchange data with the networked system 102 over the network 104.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the networked system 102.

Turning specifically to the networked system 102, a web server 122 is coupled to (e.g., via wired or wireless interfaces), and provides web interfaces to, an application server 140. In some embodiments, the attrition valuation system 150 runs and executes on the application server 140, while in other embodiments, the application server 140 provides the client device 110 with a set of instructions (e.g., computer-readable code) that causes the web client 112 and the client application 114 of the client device 110 to execute and run the attrition valuation system 150.

Figure 2:
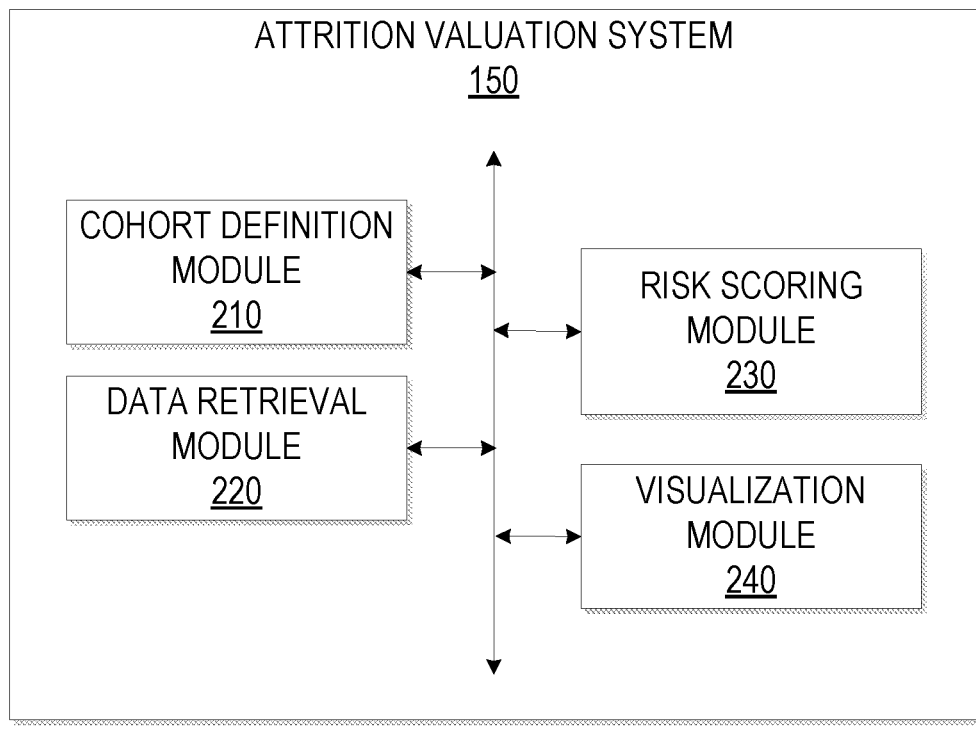
FIG. 2 is a block diagram illustrating various components of the attrition valuation system, which is provided as part of the network system, according to some example embodiments.

FIG. 2 is a block diagram illustrating various components of the attrition valuation system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the composite interface system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The attrition valuation system 150 is shown as including a cohort definition module 210, a data retrieval module 220, a risk scoring module 230, and a visualization module 240, all configured to communicate with each other (e.g., via a bus, shared memory, a switch, or application programming interfaces (APIs)).

The cohort definition module 210 is responsible for receiving a cohort definition that defines a subset of users from among a population. The cohort definition includes combinations of features and feature values. Features may include, for example, demographics attributes, such as ethnicity, age, gender, and marital status, as well as employment features, such as rank, department, start-date, location, and compensation. Feature values indicate a value of a corresponding feature. For example, a feature of "location," may have a corresponding feature value of "Palo Alto." The features and feature values may be time independent or time dependent. For example, gender and age at a start date are time independent, while location, assignment (e.g., project), and performance review may be time dependent.

In receiving the cohort definition, the cohort definition module 210 may receive the features and feature values as inputs entered into a GUI presented at a client device 110. The GUI may include a set of one or more graphical elements, such as menus and text input fields, where a user (e.g., user 106) may provide user inputs (e.g., through appropriate interaction with input devices) to select or otherwise specify features and feature values. The cohort definition module 210 may additionally receive inputs indicating whether to "include" or "exclude" features and feature values from a cohort definition. For example, the user 106 may select a graphical icon to indicate whether to "include" or "exclude" a particular feature or feature value from the cohort definition, such that the subset of users from among the population is defined (based on the cohort definition) to "include" individuals with employment data that has the feature or feature value (e.g., started their tenure of employment within 3 months), but "exclude" those individuals with employment data that has the same or another feature (e.g., are located in San Francisco, or started their tenure of employment within 1 month).

Upon receiving the cohort definition through the GUI at the client device 110, the cohort definition module 210 indexes and stores the cohort definition at a memory location (e.g., within the databases 126). The cohort definition module 210 may thereafter access and retrieve the cohort definition at the memory location.

The data retrieval module 220 retrieves employment data from a data repository (e.g., database 126, or third party data source 130) based on the cohort definition. The database 126 may, for example, store employment data associated with a population (e.g., of individuals). The data retrieval module 220 obtains the cohort definition (e.g., defining the feature and feature values of the subset of users) from the cohort definition module 210, and based on the cohort definition, identifies a subset of users within the population.

The data retrieval module 220 accesses the data repository (e.g., database 126) and retrieves employment data corresponding to the subset of user defined by the cohort definition. The employment data includes the features and feature values delineated from the cohort definition, as well as attrition and survival rates of the subset of users.

The risk scoring module 230 calculates an attrition value (e.g., a risk score) of the subset of users based on the employment data. The attrition value provides an indication of how likely a user or group of users (e.g., the subset of users) will leave over a period of time. The attrition value may include a pure number value, and/or a percentage. In some embodiments, the risk scoring module 230 calculates an attrition value for the subset of users using a Kaplan-Meier survival curve, or a Cox model.

In some example embodiments, the risk scoring module 230 may additionally receive an attrition type to apply to the calculation of the attrition value. Attrition types include, for example, voluntary, voluntary regrettable, voluntary non-regrettable, involuntary, involuntary volatile, and involuntary neutral. Based on the one or more attrition types specified, the risk scoring module 230 calculates an attrition value of the subset of users based on the employment data and the attrition type, using a Kaplan-Meier survival curve or a Cox model. For example, consider an embodiment wherein the attrition types include "voluntary," "involuntary," and "all," where "voluntary" attrition includes quitting from a position, "involuntary" includes being fired from a position, and "all" includes both. In a typical company, we would expect the number of people who are fired to be less than the number of people who quit. By comparing the "voluntary" attrition population to the "involuntary" attrition population, we would expect to see a survival curve for the "voluntary" attrition population to show higher levels of attrition at all points, versus the survival curve for the "involuntary" attrition population.

In some instances, the scoring module 230 calculates a contribution of each feature of a subset of users to the attrition value. For example, the contribution of a feature may comprise a percentage, or pure number value, indicating how much the feature effects the attrition value.

The visualization module 240 provides functionality for the attrition valuation system 150 to generate and cause display of a visualization of the attrition value of the subset of users. The visualization may include a bar graph indicating an attrition value of each user among the subset of users, or an attrition value of the subset of users compared to other subsets of users. The visualization presented by the visualization module 240 may include a set of graphical slider elements to receive inputs varying an X-axis value or Y-axis value. For example, by providing a user input into a graphical sliver element corresponding to the X-axis, a user may vary the period of time over which the visualization is intended to cover. In response, the risk scoring module 230 may recalculate the attrition value based on the time period, and cause the visualization module 240 to update the visualization at the client device. The visualization module 240 may receive a user input specifying one or more subsets of users (e.g., previously defined by a cohort definition), and overlay visualizations of the one or more subsets of users within a GUI (on top of one another).

Figure 3:
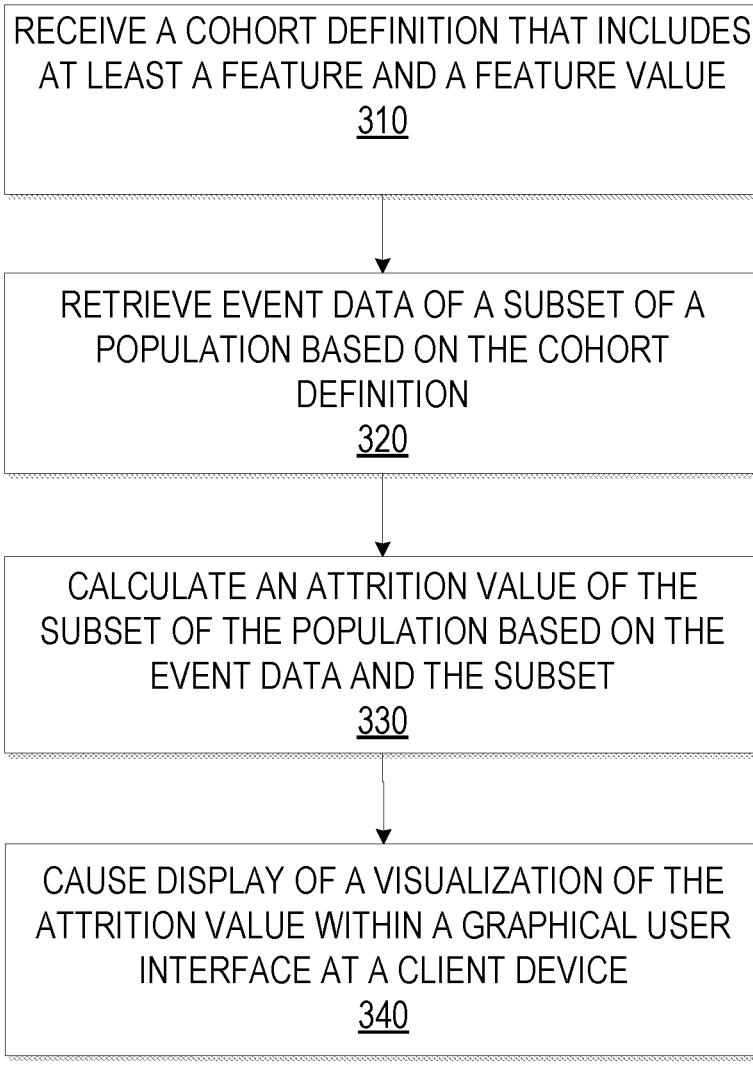
FIG. 3 is a flowchart illustrating a method for providing a visualization of an attrition value, according to some example embodiments.

FIG. 3 is a flowchart illustrating a method 300 for causing display of a visualization of an attrition value within a graphical user interface of a client device 110, according to some example embodiments. The method 300 is embodied in computer-readable instructions for execution by one or more processors such that the operations of the method 300 are performed in part or in whole by the attrition valuation system 150; accordingly, the method 300 is described below by way of example with reference thereto. However, it shall be appreciated that at least some of the operations of the method 300 may be deployed on various other hardware configurations, and the method 300 is not intended to be limited to the attrition valuation system 150.

At operation 310, the cohort definition module 210 receives a cohort definition as a user input (e.g., into a GUI) that includes at least a feature and a feature value. The GUI includes a set of graphical elements configured to receive user inputs specifying features and feature values. The graphical elements may include drop down menus, as well as text input fields. Additionally, the GUI may include graphical elements to that allow the user to indicate whether to include or exclude a selected feature or feature value from the cohort definition.

At operation 320, the data retrieval module 220 retrieves employment data (e.g., from database 126, third-party data source 130) of a subset of users from among a population based on the cohort definition. For example, the subset of users may all individually have employment data that includes (or excludes) features and features values specified in the cohort definition. The employment data includes the features and features values of the cohort definition, as well as attrition and survival rates of the subset of users. The data retrieval module 220 transmits the employment data of the subset of users to the risk scoring module 230.

At operation 330, the risk scoring module 230 calculates an attrition value (e.g., risk score) of the subset of users based on the employment data. The attrition value includes a percentage or a pure number value, and may be calculated based on a Kaplan-Meier survival curve, or a Cox model. In some embodiments, the risk scoring module 230 may additionally receive an attrition type, and may calculate the attrition value based on the attrition type. The attrition type identifies a reason for attrition—for example, voluntary attrition (e.g., quit), or involuntary attrition (e.g., fired). The attrition value may therefore specify a likelihood that attrition of the specified type occurs for the subset of users. In some example embodiments, the risk scoring module 230 may calculate attrition values for all attrition types identified within the employment data of the subset of users.

At operation 340, the visualization module 240 causes display of a visualization of the attrition value within a GUI at the client device 110. The visualization may include a bar graph, graph, or curve representing the attrition value of the subset of users defined by the cohort definition. An example of the visualizations generated by the visualization module 240 can be seen in FIGS. 10-12.

Figure 4:
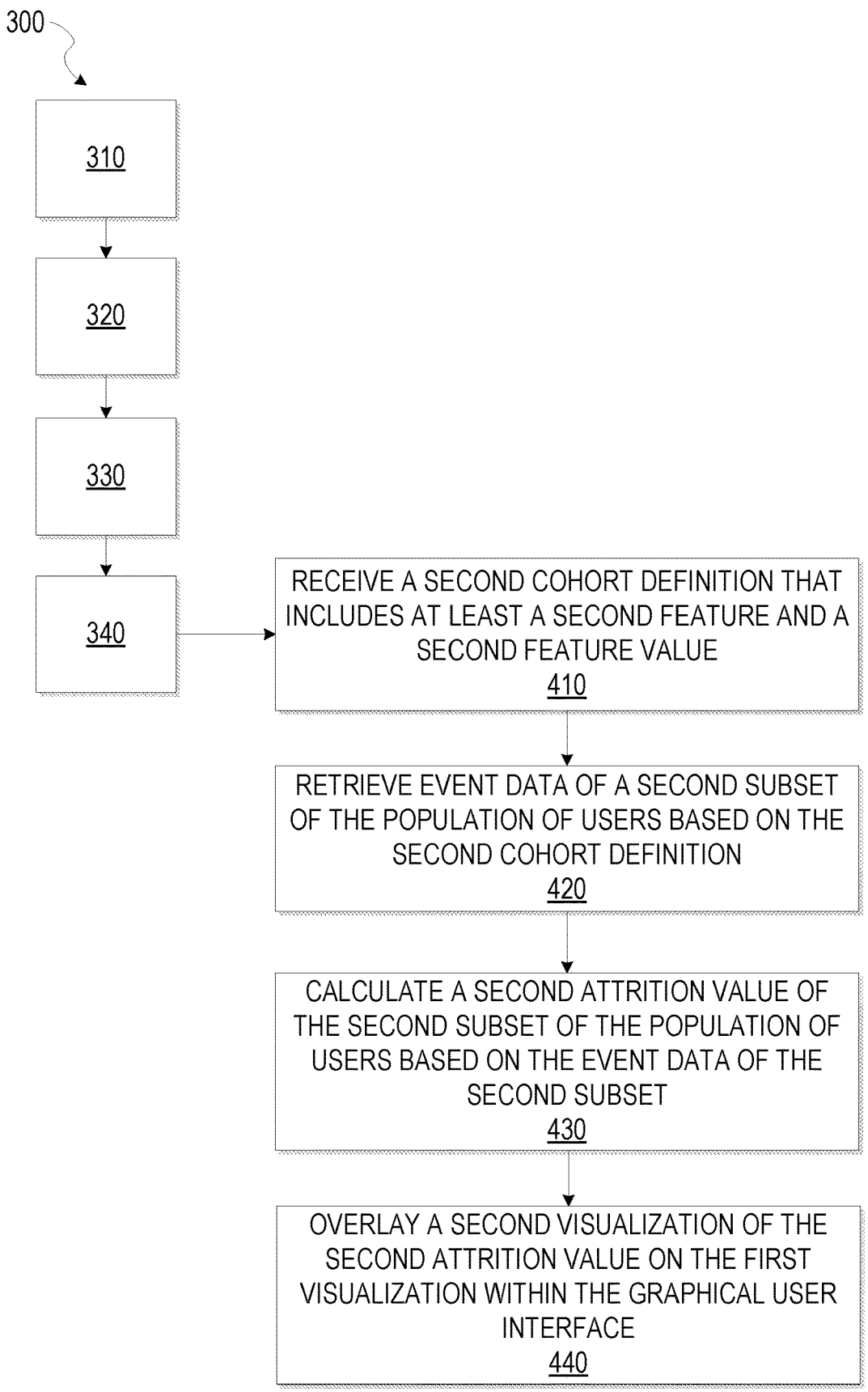
FIG. 4 is a flowchart, illustrating a method for providing a visualization of an attrition value, according to some example embodiments.

FIG. 4 is a flowchart, illustrating a method 300 for overlaying a visualization of an attrition value of a second subset of users over a visualization of a first subset of users within a GUI at a client device 110, according to some example embodiments. As shown in FIG. 4, one or more operations 410, 420, 430, and 440 may be performed as part (e.g., a precursor task, a subroutine, or a portion) of operation 340, in which the visualization module 240 causes display of a visualization of the attrition value within a GUI at the client device 110, according to some example embodiments. While FIG. 4 only depicts a method with two cohort definitions and two visualizations, example embodiments may enable greater than two cohort definitions and visualization to be generated.

At operation 410, the cohort definition module 210 receives a second cohort definition that includes a combination of features and feature values distinct from previous cohort definitions received prior. For example, the second cohort definition may include (or exclude) features previously omitted from prior cohort definitions received by the cohort definition module 210.

Operation 420 may be performed by the data retrieval module 220. The data retrieval module 220 accesses a data repository (e.g., database 126) to retrieve employment data corresponding to a subset of users among a population, based on the second cohort definition.

Operation 430 may be performed by the risk scoring module 230. The risk scoring module 230 calculates a second attrition value of the second subset of users based on the employment data. The risk scoring module 230 assigns the second attrition value to the cohort definition.

Operation 440 may be performed by the visualization module 240. The visualization module overlays a second visualization of the second attrition value corresponding to the second subset of users over the visualization of the attrition value previously calculated by the risk scoring module 240. In some example embodiments, the visualizations may be displayed in visibly distinct colors or patterns (e.g., dotted or dashed lines, or blue and red).

Figure 5:
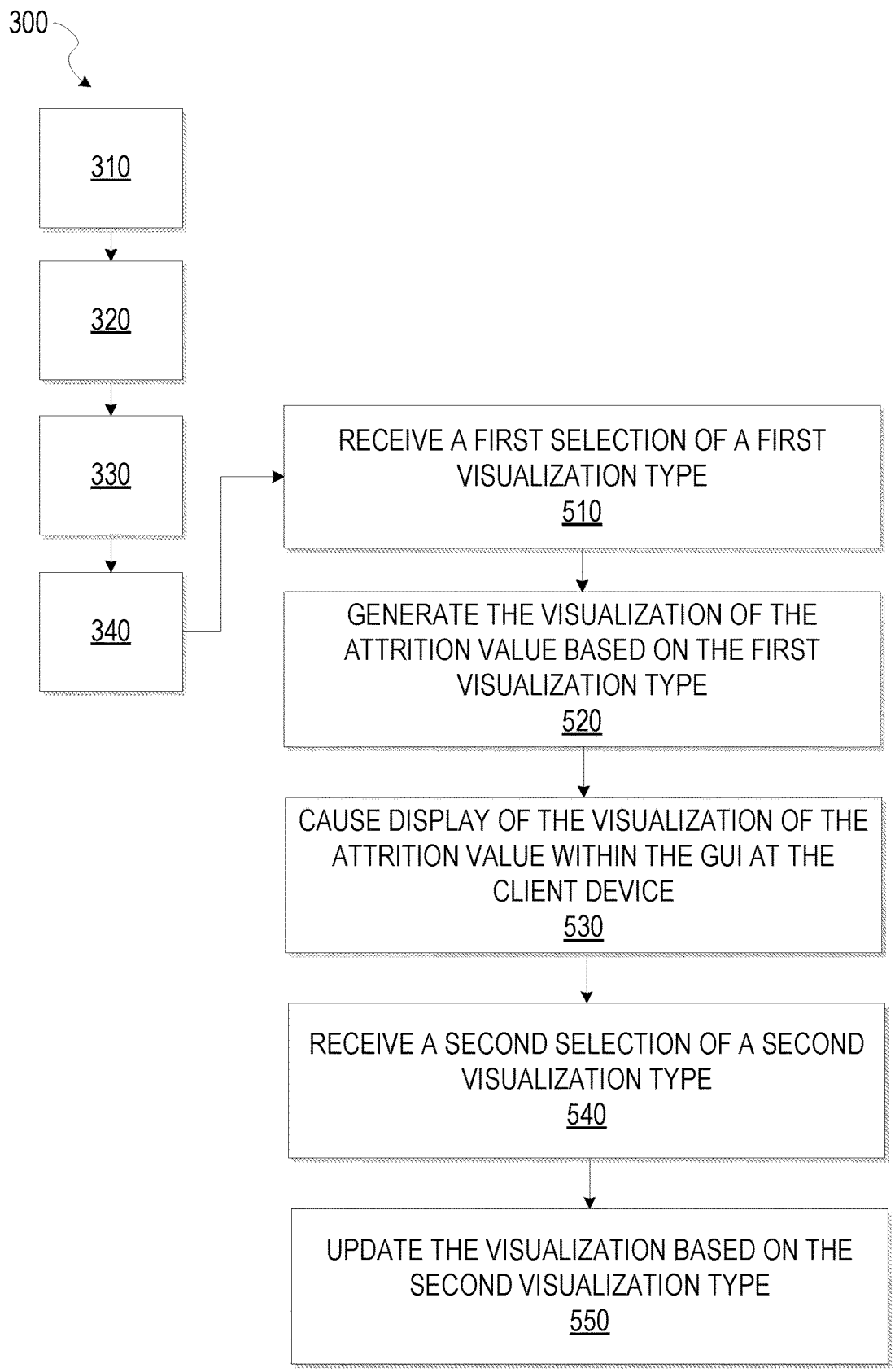
FIG. 5 is a flowchart, illustrating a method for providing a visualization of an attrition value, according to some example embodiments.

FIG. 5 is a flowchart, illustrating operations of the method 300 for updating the visualization presented in the GUI at the client device 110 based on a user input specifying a visualization type. As shown in FIG. 5, one or more operations 510, 520, 530, 540, and 550 may be performed as part (e.g., a precursor task, a subroutine, or a portion) of operation 340 in which the visualization module 240 generates and causes display of a visualization of the attrition value within a GUI at the client device 110, according to some example embodiments.

In some example embodiments, the attrition valuation system 150 may be configured to generate and cause display of a visualization interface to receive a selection of a visualization type within a portion of the GUI at the client device 110. The visualization interface may include a selectable listing of visualization types (e.g., a drop-down menu) such as Kaplan-Meier survival curve or Cox model. By providing a user input through the client device 110, a user 106 may select a visualization type (e.g., bar graph) from among the listing of visualization types.

At operation 510, the visualization module 240 receives a selection of a first visualization type from among a listing of visualization types. For example, a user 106 may provide an input selecting that the visualization be generated based on a Kaplan-Meier survival curve.

At operation 520, the visualization module 240 generates a visualization of the attrition value corresponding to the subset of users, based on the selection of the visualization type (e.g., Kaplan-Meier survival curve). The visualization may comprise, for example, a graph having a first axis and a second axis. At operation 530, the visualization module 240 causes display of the visualization of the attrition value within the GUI at the client device 110.

At operation 540, the user 106 may provide a subsequent selection of a visualization type from among the available visualization types. For example, the user 106 may provide a selection of a Cox model. In response, at operation 550, the visualization module 240 generates a Cox model based on the attrition value of the corresponding subset of users, and updates the display of the visualization based on the subsequent visualization type selected.

Figure 6:
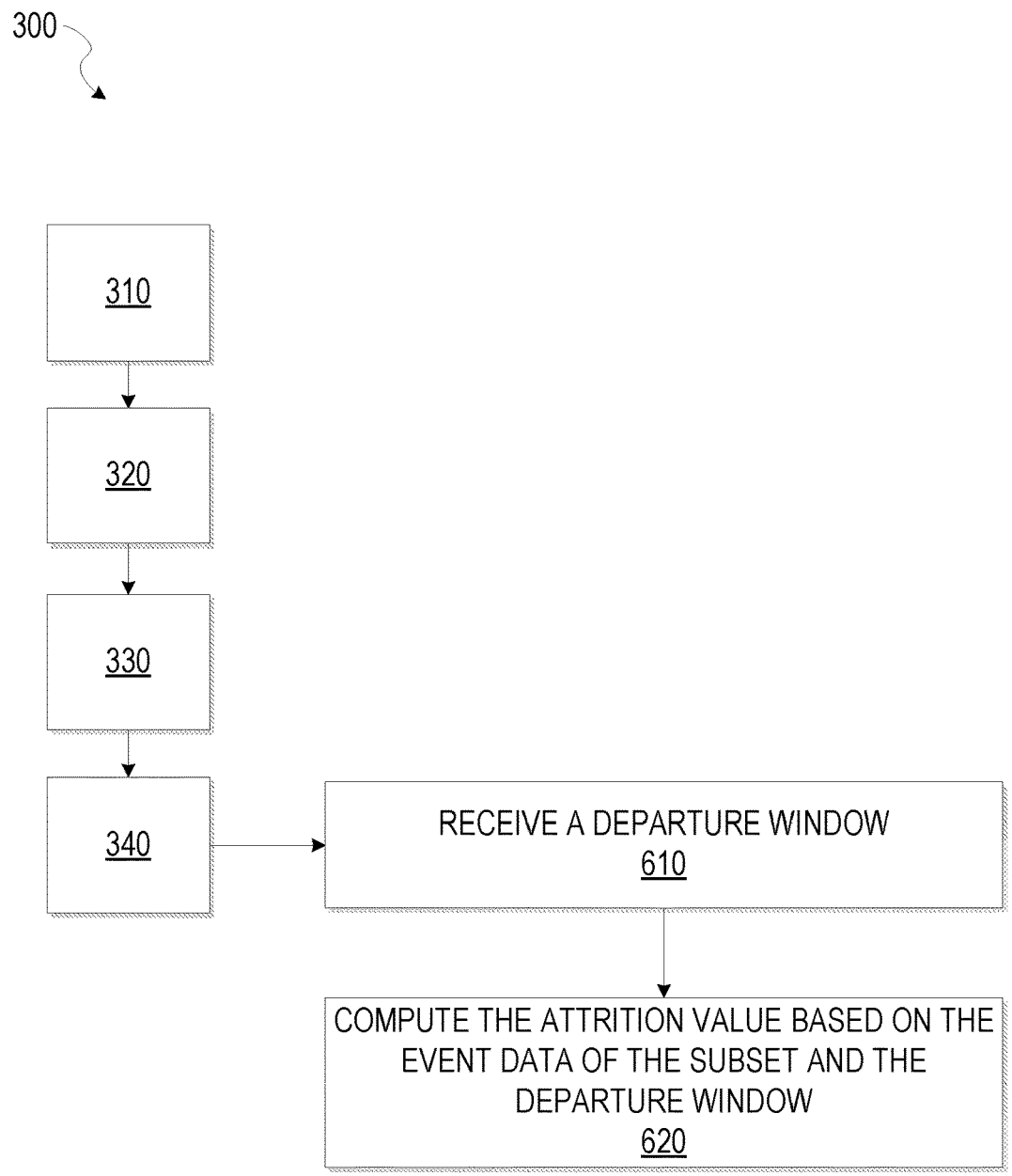
FIG. 6 is a flowchart, illustrating a method for computing an attrition value based on employment data and a departure window, according to some example embodiments.

FIG. 6 is a flowchart, illustrating operations of the method 300 for computing an attrition value based on employment data and a departure window, according to some example embodiments. As shown in FIG. 6, one or more operations 610, and 620 may be performed as part (e.g., a precursor task, a subroutine, or a portion) of operation 340 in which the visualization module 240 generates and causes display of a visualization of the attrition value within a GUI at the client device 110, according to some example embodiments.

In some example embodiments, the GUI includes a graphical element (e.g., slider, text field) to receive an input to define a departure window to be applied to the calculation of the attrition value. Upon receiving a user input to specify a departure window, the risk scoring module 230 calculates an attrition value of a subset of users based on the departure window specified. The attrition value indicates a likelihood that a user or subset of users will leave (e.g., leave a company, quit a job, cancel a subscription) within a specified period of time—the departure window defines the specified period of time. For example, as the departure window increases, the attrition value may increase (more likely that a user will leave over a broader period of time).

At operation 610, the risk scoring module 230 receives a departure window as a user input into the GUI at the client device 110. The departure window may specify a period of time based on a start date and an end date, or may simply specify a duration of time (e.g., 3 months).

At operation 620, the risk scoring module 230 calculates the attrition value of the subset of users based on the employment data and the departure window specified. The attrition value may additionally be based on a visualization type specified by the user 106, as well as an attrition type.

Figure 7:
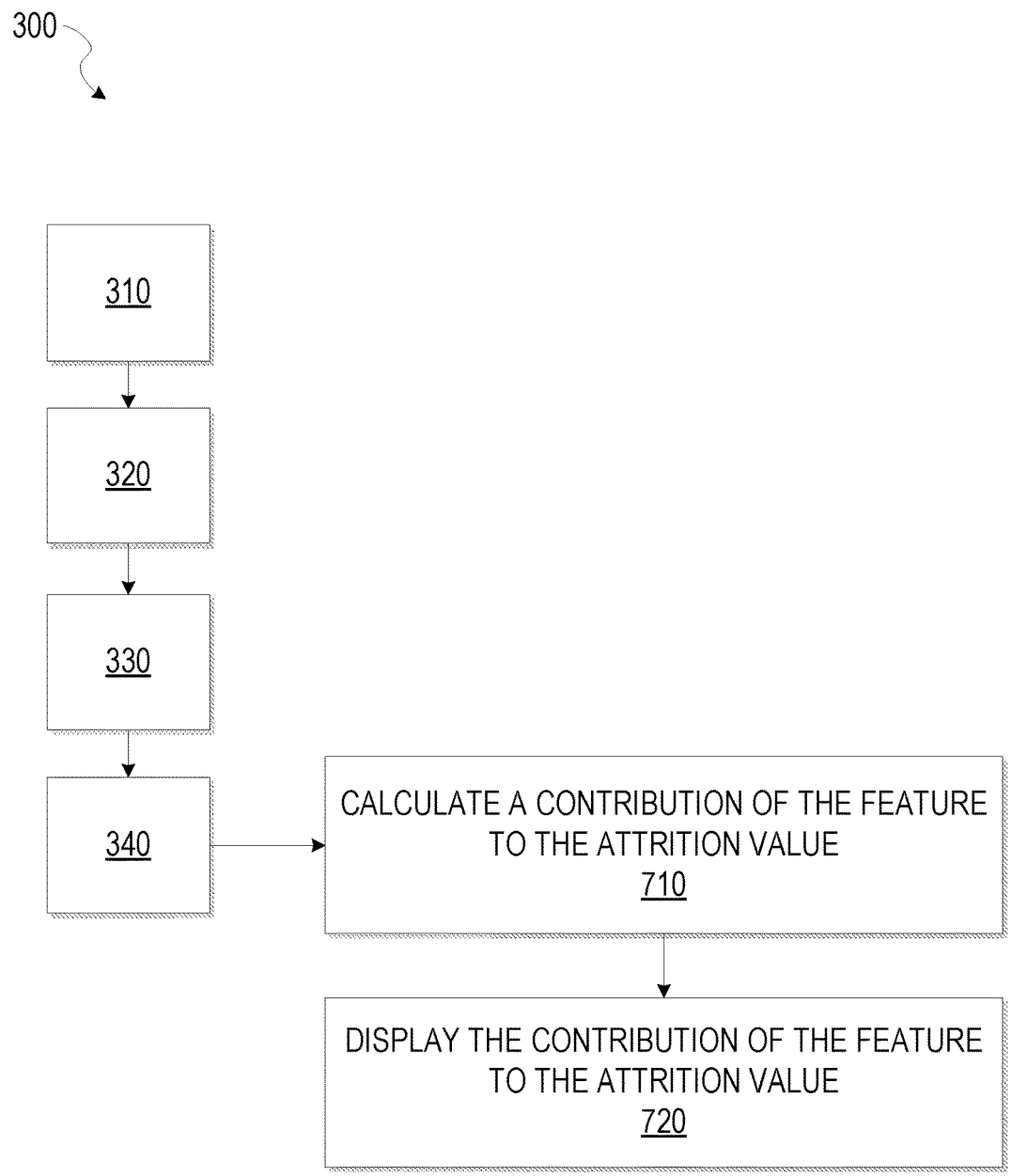
FIG. 7 is a flowchart, illustrating a method for displaying a contribution of a feature to the attrition value, according to some example embodiments.

FIG. 7 is a flowchart, illustrating operations of the method 300 for displaying a contribution of a feature of the subset of users to the calculated attrition value, according to some example embodiments. As shown in FIG. 7, one or more operations 710, and 720 may be performed as part (e.g., a precursor task, a subroutine, or a portion) of operation 340 in which the visualization module 240 generates and causes display of a visualization of the attrition value within a GUI at the client device 110, according to some example embodiments.

At operation 710, the risk scoring module 230 calculates a contribution value of one or more features of a cohort definition to the calculated attrition value. The contribution value of a feature indicates how much the existence of the feature within the cohort definition effects the attrition value. The risk scoring module 230 may access the cohort definition module 210 to retrieve the cohort definition of a subset of users, and calculate an attrition value corresponding to each feature and feature value among the features and feature values comprising the cohort definition based on a Cox model. The risk scoring module 230 may then calculate a contribution value of each feature and feature value to the overall attrition value of the subset of users. The contribution value may be a percentage (e.g., 10% increase), or a pure number value.

At operation 720, the visualization module 240 causes display of the contribution value of the feature within the GUI at the client device 110. For example, the visualization module 240 may cause display of a listing of each feature of the cohort definition, and display the contribution value of each feature among the listing.

Figure 8:
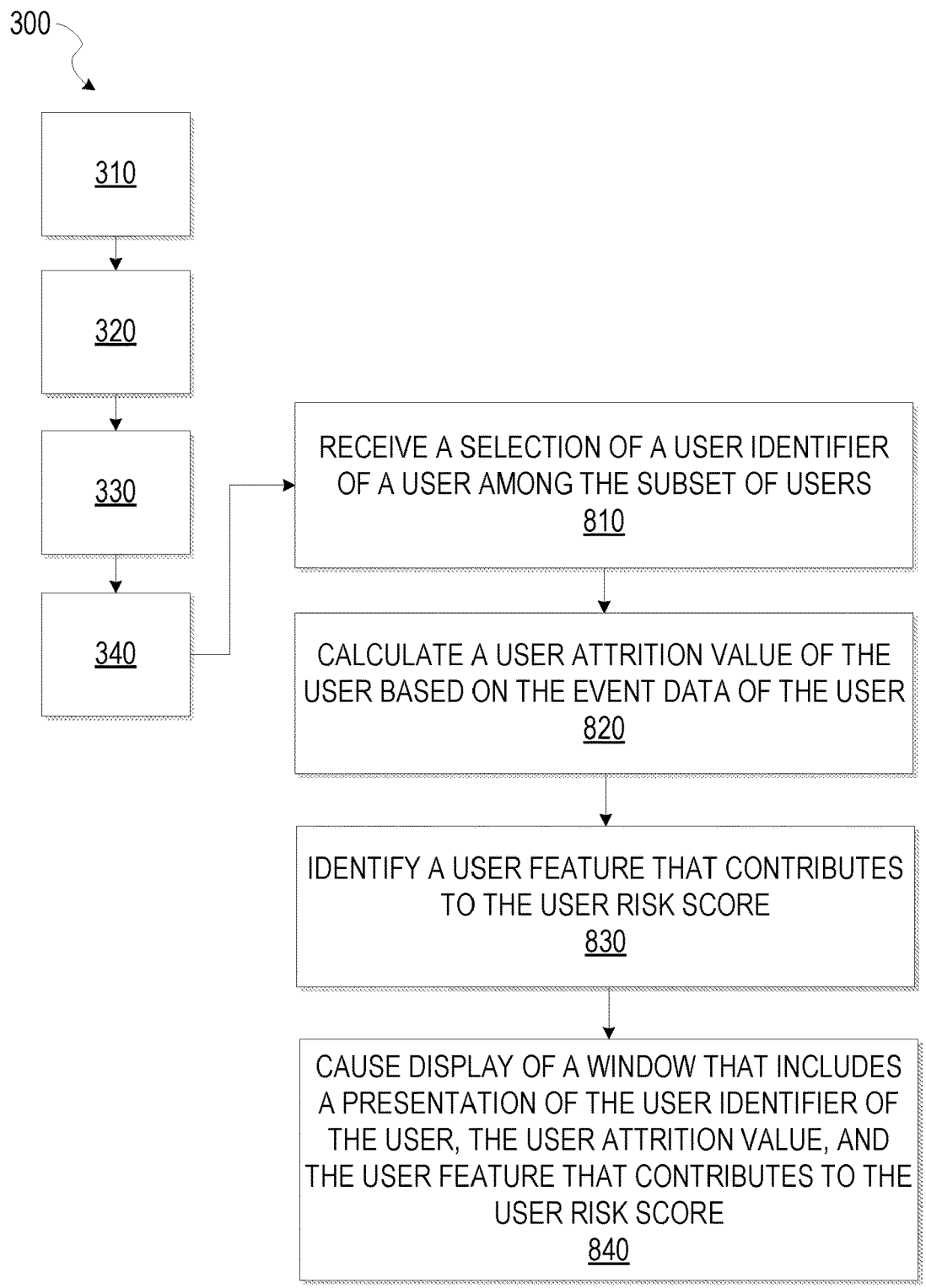
FIG. 8 is a flowchart, illustrating a method for causing display of a window that includes a presentation of an attrition value associated with a user, according to some example embodiments.

FIG. 8 is a flowchart, illustrating operations of the method 300 for causing display of a window that includes a presentation of an attrition value associated with a user, according to some example embodiments. As shown in FIG. 8, one or more operations 810, 820, 830, and 840 may be performed as part (e.g., a precursor task, a subroutine, or a portion) of operation 340 in which the visualization module 240 generates and causes display of a visualization of the attrition value within a GUI at the client device 110, according to some example embodiments.

At operation 810, the data retrieval module 220 receives a selection of a user identifier corresponding to a user among the subset of users. For example, a user 106 may provide a user input through the GUI at the client device 110 that includes the user identifier.

In response to receiving the selection of the user identifier, at operation 820, the risk scoring module 230 calculates a user attrition value corresponding to the user, based on the employment data of the user. The user attrition value may include a percentage that indicates a likelihood that the user will leave (e.g., quit, cancel a subscription), as well as a pure number value.

At operation 830, the risk scoring module 230 identifies a feature of the specified user which contributes to the user attrition value. For example, the risk scoring module 230 may identify those feature which contribute beyond a predefined threshold value to the user attrition value. The risk scoring module may, for example calculate the user attrition value of the user based on a Cox model and the features and employment data of the user.

At operation 840, the visualization module 240 causes display of a window that includes a presentation of the user identifier of the user, the user attrition value, and the user feature that contributes to the user attrition value. The visualization module 240 may additionally present a percentage or pure number value indicating the contribution value of each feature of the user.

Figure 9:
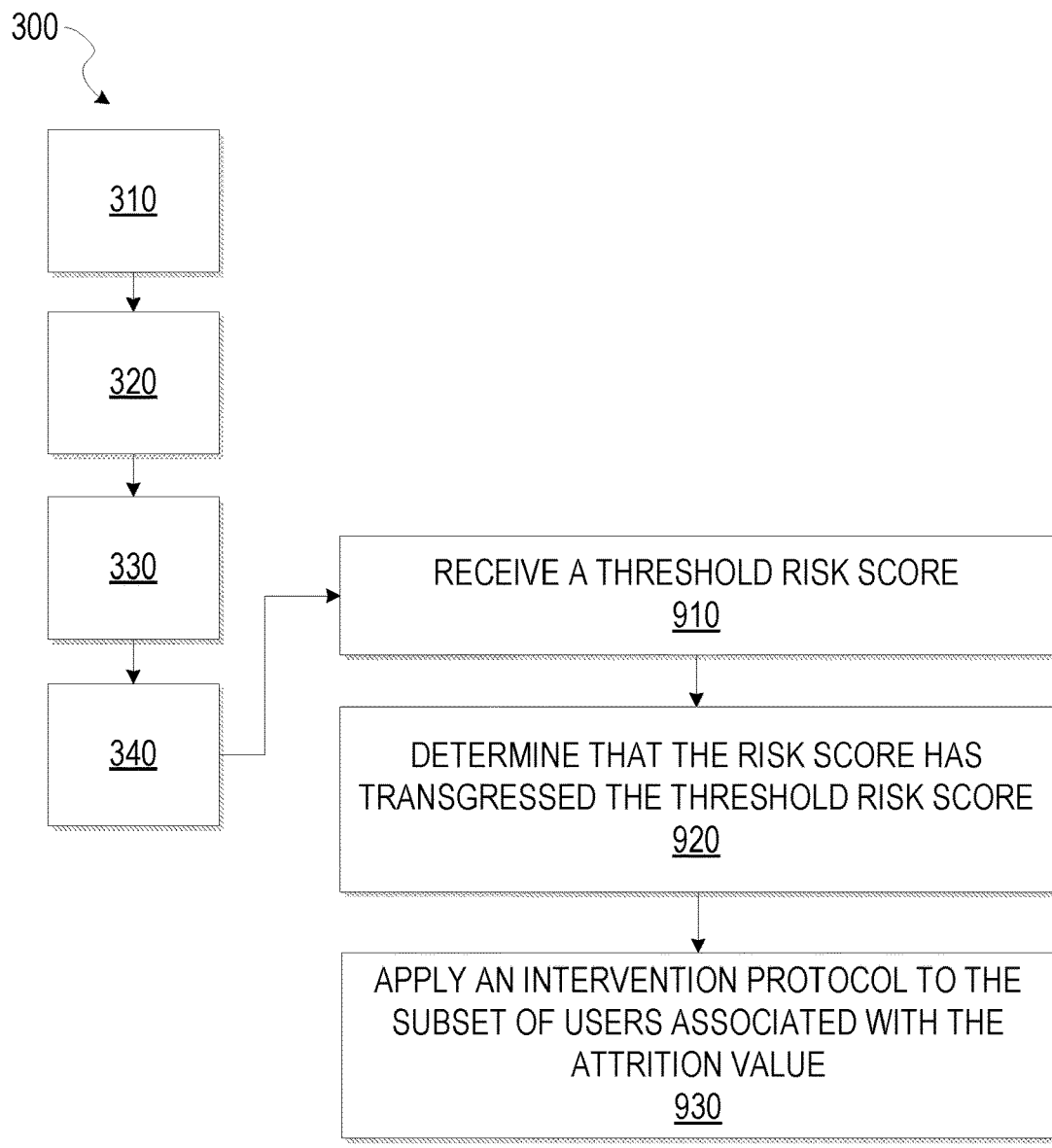
FIG. 9 is a flowchart, illustrating a method for applying an intervention protocol to a subset of users, according to some example embodiments.

FIG. 9 is a flowchart, illustrating operations of the method 300 for applying an intervention protocol to a subset of users, according to some example embodiments. As shown in FIG. 9, one or more operations 910, 920, and 930 may be performed as part (e.g., a precursor task, a subroutine, or a portion) of operation 340 in which the visualization module 240 generates and causes display of a visualization of the attrition value within a GUI at the client device 110, according to some example embodiments.

At operation 910, the risk scoring module 230 receives a threshold risk score as a user input entered through the GUI at the client device 110. For example, the threshold risk score may include a maximum percentage or maximum pure number value.

At operation 920, the risk scoring module 230 compares the attrition value of the subset of users against the threshold risk score to determine whether the attrition value has transgressed the threshold defined by the threshold risk score. For example, the threshold risk score may indicate a value of 25%, and as such, any attrition value that exceeds 25% is considered to have transgressed the threshold.

At operation 930, after determining that an attrition value has transgressed the threshold risk score, the attrition valuation system 150 applies an intervention protocol to the subset of users associated with the attrition value. For example, the application of an intervention protocol may include flagging the subset of users (or individual user) in a database, and indicating that the user should receive an incentive (e.g., a bonus).

Figure 10:
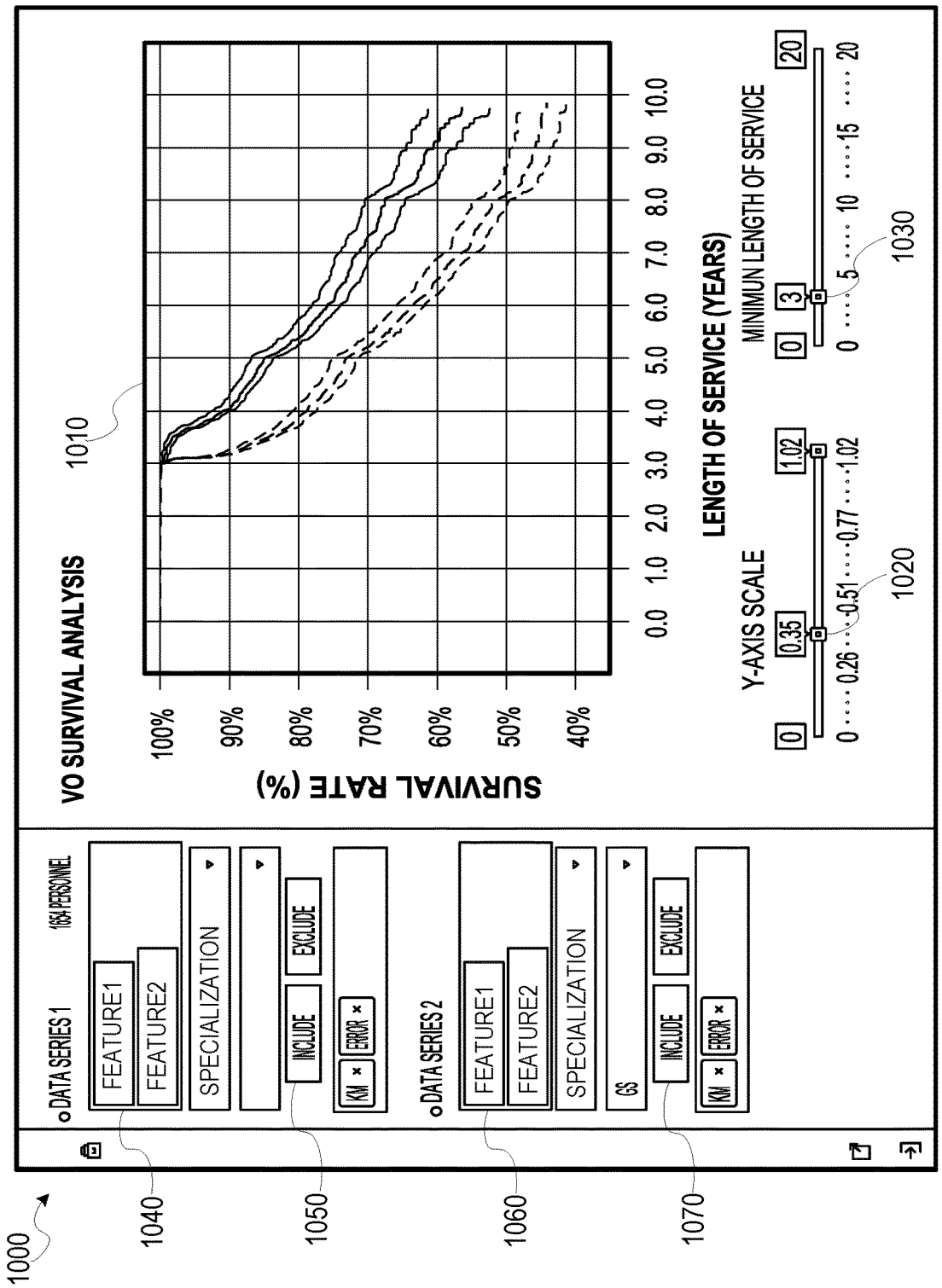
FIG. 10 is an interface diagram illustrating an attrition value visualization interface, consistent with some embodiments.

FIG. 10 is an interface diagram illustrating a visualization interface 1000, configured to display a visualization window 1010 to display visualizations of attrition values, consistent with some embodiments. As shown, the visualization interface 1000 includes cohort definition menus 1040 and 1060, icon 1050 and 1070 to include or exclude features from a cohort definition, and slider elements 1020 and 1030 to define a time period to calculate an attrition value.

The visualization interface 1000 is displayed at a client device 110. The visualization interface 1000 receives a cohort definition through the cohort definition windows 1040 and 1060. As seen in FIG. 10, the cohort definition menu 1040 includes a set of graphical menus operable to receive selections of features and feature values. A user 106 may select a feature through the menu 1040 by providing a user input to a drop down menu which includes a listing of one or more features. Upon selecting a feature, the user 106 may additionally provide a feature value. Additionally, the cohort definition menu 1040 includes icon 1050 to receive an input to define whether to include or exclude a selected feature and feature value from the cohort definition. As shown in FIG. 10, the visualization window 1010 may display a set of one or more Kaplan-Meier survival curves based on employment data of a subset of users.

After receiving a cohort definition through the visualization interface 1000, the attrition valuation system 150 calculates an attrition value of the subset of users defined by the cohort definition, and generates and causes display of the visualization 1010. The visualization window 1010 may include one or more visualizations of attrition values—for example, the visualization window 1010 may include two or more visualization of attrition values (e.g., based on cohort definitions) overlaid on top of one another. In some example embodiments, the visualizations of attrition values are presented in distinct colors or patterns (e.g., cohort definition 1 in blue, cohort definition 2 in red).

The visualization interface 1000 is also shown to include slider elements 1020 and 1030 to receive inputs definition a time period over which to calculate an attrition value. For example, a user 106 may provide a user input to the slider element 1030 to adjust a minimum, or in some embodiments, maximum, length of service. In response, the attrition valuation system 150 recalculates an attrition value and corresponding visualization of the attrition value for the subset, or subsets of users, and causes display of the visualizations within the visualization window 1010.

Figure 11:
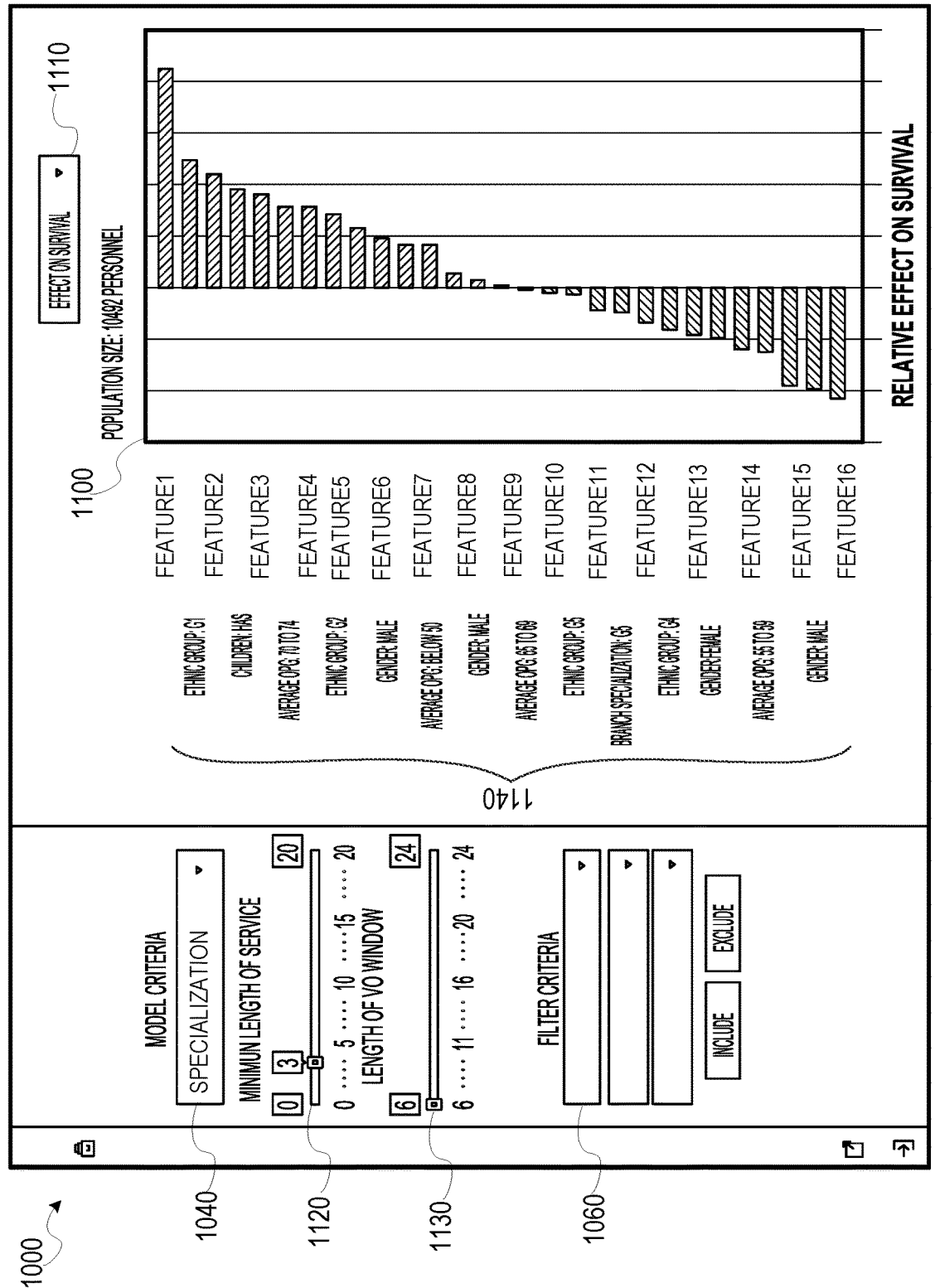
FIG. 11 is an interface diagram illustrating an attrition value visualization interface, consistent with some embodiments.

FIG. 11 is an interface diagram illustrating a visualization interface 1000, configured to display a visualization window 1100 to display visualizations of attrition values, consistent with some embodiments. As shown, the visualization interface 1000 includes an attrition type menu 1110, cohort definition windows 1040 and 1060, slider elements 1120 and 1130, and feature listing 1140.

As in FIG. 10, a user 106 provides a cohort definition through the cohort definition menus 1040 and 1060 by selecting one or more features and feature values. In response the attrition valuation system 150 causes display of the selected features and feature values as the feature listing 1140. Thus, the feature listing 1140 includes each feature of a cohort definition. The visualization window 1100 includes a display of the attrition value of each feature and feature value from among the cohort definition. The attrition value may be calculated based on a Cox model, and displayed as a pure number value. The attrition values are therefore displayed relative to one another. A user 106 may provide an input through the slider elements 1120 and 1130, and in response, the attrition valuation system 150 may adjust the display of the attrition values within the visualization window 1100.

FIG. 12 is an interface diagram illustrating a visualization interface 1000, configured to display a visualization window 1200 to display visualizations of attrition values, consistent with some embodiments. As shown, the visualization interface 1000 includes a cohort definition menu 1040, a slider element 1120, and a feature listing 1210, that includes a presentation of one or more features and feature values of a cohort definition.

After receiving a cohort definition and calculating an attrition value of the subset of users corresponding to the cohort definition, the attrition valuation system 150 calculates an attrition value of each feature and feature value. The visualization window 1200 includes a display of each feature from a cohort definition, along with an attrition value corresponding to the feature. The attrition value may be presented as a percentage (e.g., likelihood that a user with the feature will leave over a period of time). The user 106 may provide an input to the slider element 1120 to alter the period of time which the attrition value is calculated, and in response, the attrition valuation system 150 recalculates and causes display of the updated attrition value.

Figure 13:
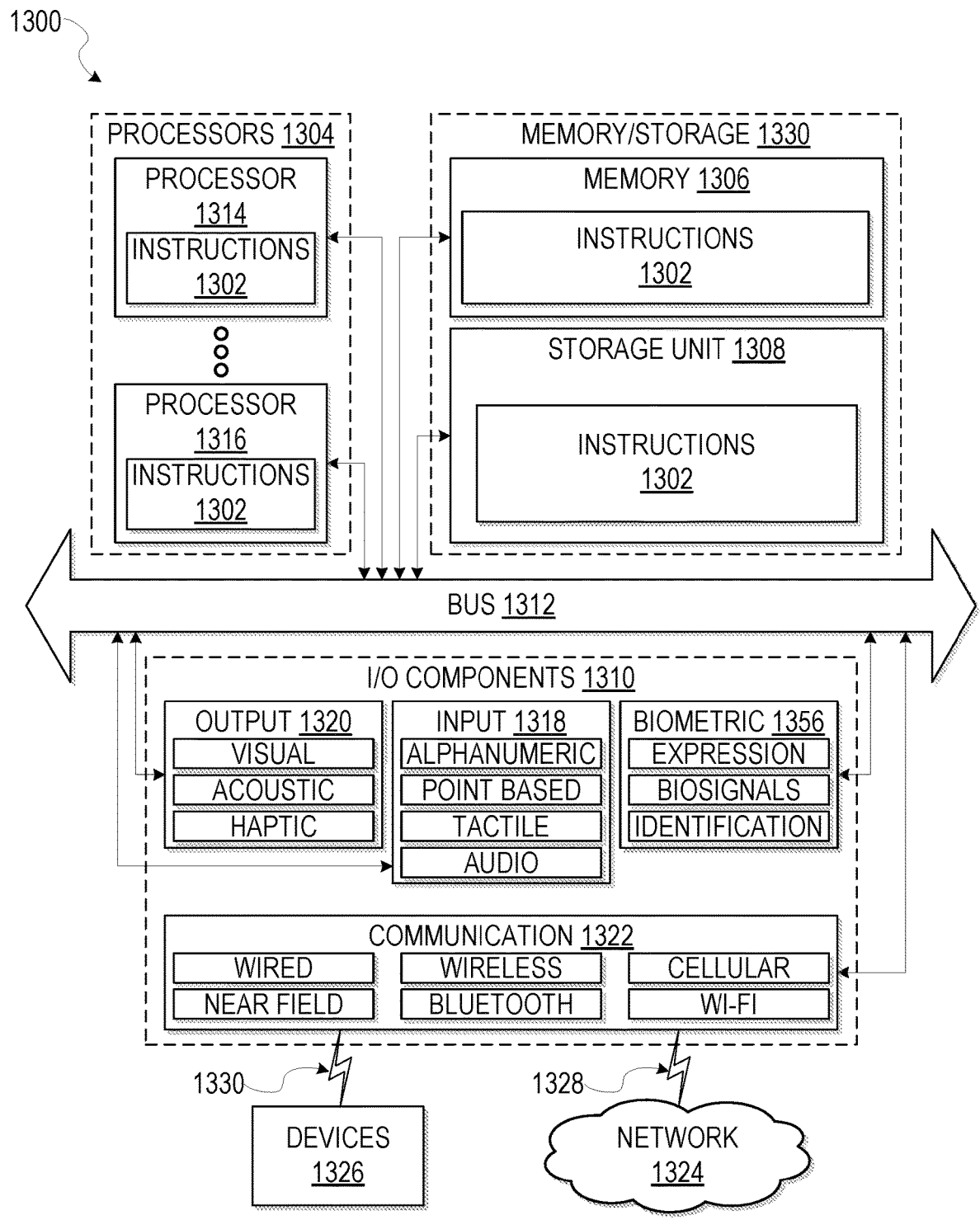
FIG. 13 is a diagrammatic representation of a machine in the example form of a computer system within which a set of instructions for causing the machine to perform any one or more of the methodologies discussed herein may be executed.

FIG. 13 is a diagrammatic representation of a machine in the example form of a computer system within which a set of instructions for causing the machine to perform any one or more of the methodologies discussed herein may be executed. Specifically, FIG. 13 shows a diagrammatic representation of the machine 1300 in the example form of a system, within which instructions 1302 (e.g., software, a program, an application, an applet, an app, a driver, or other executable code) for causing the machine 1300 to perform any one or more of the methodologies discussed herein may be executed. For example, the instructions 1302 include executable code that causes the machine 1300 to execute the methods illustrated in FIGS. 4-9. In this way, these instructions 1302 transform the general, non-programmed machine into a particular machine programmed to carry out the described and illustrated functions in the manner described herein. The machine 1300 may operate as a standalone device or may be coupled (e.g., networked) to other machines.

By way of non-limiting example, the machine 1300 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1302, sequentially or otherwise, that specify actions to be taken by machine 1300. Further, while only a single machine 1300 is illustrated, the term "machine" shall also be taken to include a collection of machines 1300 that individually or jointly execute the instructions 1302 to perform any one or more of the methodologies discussed herein.

The machine 1300 may include processors 1304, memory 1306, storage unit 1308 and I/O components 1310, which may be configured to communicate with each other such as via a bus 1312. In an example embodiment, the processors 1304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1314 and processor 1316 that may execute instructions 1302. The term "processor" is intended to include multi-core processors that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory 1306 (e.g., a main memory or other memory storage) and the storage unit 1308 are both accessible to the processors 1304 such as via the bus 1312. The memory 1306 and the storage unit 1308 store the instructions 1302 embodying any one or more of the methodologies or functions described herein. In some embodiments, the databases 126 resides on the storage unit 1308. The instructions 1302 may also reside, completely or partially, within the memory 1306, within the storage unit 1308, within at least one of the processors 1304 (e.g., within the processor's cache memory), or any suitable combination thereof, during execution thereof by the machine 1300. Accordingly, the memory 1306, the storage unit 1308, and the memory of processors 1304 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 1302. The term "machine-readable medium" shall also be taken to include any medium, or combination of multiple media, that is capable of storing instructions (e.g., instructions 1302) for execution by a machine (e.g., machine 1300), such that the instructions, when executed by one or more processors of the machine 1300 (e.g., processors 1304), cause the machine 1300 to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1310 may include a wide variety of components to receive input, provide output, produce output, transmit information, exchange information, capture measurements, and so on. The specific I/O components 1310 that are included in a particular machine will depend on the type of machine. For example, portable machines such as mobile phones will likely include a touch input device or other such input mechanisms, while a headless server machine will likely not include such a touch input device. It will be appreciated that the I/O components 1310 may include many other components that are not specifically shown in FIG. 13. The I/O components 1310 are grouped according to functionality merely for simplifying the following discussion and the grouping is in no way limiting. In various example embodiments, the I/O components 1310 may include input components 1318 and output components 1320. The input components 1318 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 1320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1310 may include communication components 1322 operable to couple the machine 1300 to a network 1324 or devices 1326 via coupling 1328 and coupling 1330, respectively. For example, the communication components 1322 may include a network interface component or other suitable device to interface with the network 1324. In further examples, communication components 1322 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1326 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors;
one or more memories; and
a set of instructions incorporated into the one or more memories, the set of instructions configuring the one or more processors to perform operations for using a network-based attrition-value system to recalculate a visualization of an attrition value of a first subset of users with and using a visualization module to overlay a visualization of an attrition value of a second subset of users over the visualization of the attrition value of the first subset of users in a graphical user interface presented on a client device, the operations comprising:
based on a receiving of first user input via the visualization module, the first user input identifying a first cohort definition, the first cohort definition including at least a first feature and a feature value of the first feature, the first feature including a user attribute of the first subset of users, identifying the first subset of users from a population of users based on the first cohort definition, using the attrition value system to compute the attrition value of the first subset users based on employment data of the first subset of users using a non-linear-regression statistical technique, and using the visualization module to cause displaying the visualization of the attrition value of the first subset of users within the graphical user interface;
based on a receiving of a second user input via the visualization module, the second user input identifying a second cohort definition, the second cohort definition including at least a second feature and a feature value of the second feature, the second feature including a user attribute of the second subset of users, using the attrition value system to identify the second subset of users from the population of users based on the second cohort definition and compute the attrition value of the second subset users based on employment data of the second subset of users using the non-linear-regression statistical technique, and using the visualization module to cause the overlaying of the visualization of the attrition value of the second set of users over the visualization of the attrition value of the second set of users within the graphical user interface; and
using the attrition value system to recalculate the attrition value and perform the recalculation of the visualization of the attrition value of the first subset of users based on a detection of an activation, via the visualization module, of a slider element of the user interface, the slider element defining a range of a value included in the employment data.

2. The system of claim 1, wherein the computing of the attrition value of the first subset includes using a Kaplan-Meier survival curve.

3. The system of claim 1, wherein the computing of the attrition value for the first subset includes using a Cox model.

4. The system of claim 1, wherein the computing of the attrition value of the first subset is based on a selection of a visualization type, the visualization type including one of voluntary, voluntary regrettable, voluntary non-regrettable, involuntary, involuntary volatile, and involuntary neutral.

5. The system of claim 1, the operations further comprising:
receiving a departure window that includes a start point and an end point; and
wherein the computing the attrition value of the first subset of the population of users is further based on the departure window.

6. The system of claim 1, the operations further comprising:
calculating a contribution value of the first feature to the first attrition value; and causing display of the contribution value of the first feature to the first attrition value.

7. The system of claim 6, wherein the contribution value of the first feature to the first attrition value is a pure number and the first attrition value is visualized as a bar graph.

8. The system of claim 1, the operations further comprising:
linking a visualization of the first attrition value to a memory location associated to the first subset of the population of users.

9. The system of claim 1, wherein the operations further comprise:
receiving a selection of a user identifier of a user among the subset of the population of users;
causing display of a user attrition value of the user based on the employment data of the user;
identifying a user feature that contributes to the user attrition value, the user feature within the employment data of the user; and
displaying of a window that includes a presentation of the user identifier, the employment data of the user, the user attrition value, and the user feature that contributes to the user attrition value, within the graphical user interface.

10. The system of claim 9, wherein the presentation of the user feature that contributes to the user attrition value includes a percentage that the user feature contributes to the user attrition value.

11. The system of claim 1, the operations further comprising:
receiving a threshold attrition value;
determining that the attrition value has transgressed the threshold attrition value; and
applying an intervention protocol to the subset of users associated with the attrition value, the intervention protocol including an incentive to be delivered to the subset of users.

12. The system of claim 1, wherein the value pertains to a length of service and the defining of the range includes specifying a minimum length of the service of a maximum length of the service.

13. The system of claim 1, the operations further comprising dynamically triggering a recalculation of the attrition value and an updating of the visualization of the attrition of the first subset of users based on an activation of an icon for including or excluding the first feature and the feature value of the first feature from the first cohort definition.

14. A method comprising:
based on a receiving of first user input via a visualization module, the first user input identifying a first cohort definition, the first cohort definition including at least a first feature and a feature value of the first feature, the first feature including a user attribute of the first subset of users, identifying the first subset of users from a population of users based on the first cohort definition, computing, using an attrition value system, the attrition value of the first subset of users using a non-linear-regression statistical technique, and using the visualization module to cause displaying the visualization of the attrition value of the first subset of users within the graphical user interface;
based on a receiving of a second user input via the visualization module, the second user input identifying a second cohort definition, the second cohort definition including at least a second feature and a feature value of the second feature, the second feature including a user attribute of the second subset of users, using the attrition value system to identify the second subset of users from the population of users based on the second cohort definition and compute the attrition value of the second subset users based on employment data of the second subset of users using the non-linear-regression statistical technique, and using the visualization module to cause overlaying of a visualization of the attrition value of the second set of users over the visualization of the attrition value of the second set of users within the graphical user interface at the client device; and
using the attrition value system to recalculate the attrition value and recalculate the visualization of the attrition value of the first subset of users based on a detection, via the visualization module, of an activation of a slider element of the user interface, the slider element defining a range of a value included in the employment data.

15. The method of claim 14, wherein the computing of the attrition value of the first subset includes using a Kaplan-Meier survival curve.

16. The method of claim 14, wherein the computing of the attrition value of the first subset includes using a Cox model.

17. The method of claim 14, wherein computing of the attrition value of the first subset is based on a selection of a visualization type, the visualization type including one of voluntary, voluntary regrettable, voluntary non-regrettable, involuntary, involuntary volatile, and involuntary neutral.

18. The method of claim 14, further comprising:
receiving a departure window that includes a start point and an end point; and
wherein the computing the attrition value of the subset of the population of users is based on the employment data of the subset and the departure window.

19. The method of claim 14, further comprising:
calculating a contribution of the first feature to the first attrition value; and
causing display of the contribution of the first feature to the first attrition value.

20. A non-transitory machine readable storage medium including instructions that, when executed by one or more process of a machine, cause the machine to perform operations comprising:
based on a receiving of first user input via a visualization module, the first user input identifying a first cohort definition, the first cohort definition including at least a first feature and a feature value of the first feature, the first feature including a user attribute of the first subset of users, identifying the first subset of users from a population of users based on the first cohort definition, computing, using an attrition value system, the attrition value of the first subset of users using a non-linear-regression statistical technique, and using the visualization module to cause displaying the visualization of the attrition value of the first subset of users within the graphical user interface;

based on a receiving of a second user input via the visualization module, the second user input identifying a second cohort definition, the second cohort definition including at least a second feature and a feature value of the second feature, the second feature including a user attribute of the second subset of users, using the attrition value system to identify the second subset of users from the population of users based on the second cohort definition and compute the attrition value of the second subset users based on employment data of the second subset of users using the non-linear-regression statistical technique, and using the visualization module to cause overlaying of a visualization of the attrition value of the second set of users over the visualization of the attrition value of the second set of users within the graphical user interface at the client device; and using the attrition value system to recalculate the attrition value and recalculate the visualization of the attrition value of the first subset of users based on a detection, via the visualization module, of an activation of a slider element of the user interface, the slider element defining a range of a value included in the employment data.

* * * * *